(12) United States Patent
Winkelmann et al.

(10) Patent No.: US 6,328,148 B2
(45) Date of Patent: Dec. 11, 2001

(54) HYDRAULIC CLUTCH RELEASE MECHANISM

(75) Inventors: Ludwig Winkelmann, Erlangen; Gerhard Meyer, Lehrberg, both of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/768,677

(22) Filed: Jan. 23, 2001

Related U.S. Application Data (63) Continuation of application No. PCT/EP99/04113, filed on Jun. 15, 1999.

(30) Foreign Application Priority Data

| Jul. 24, 1998 | (DE) | ............................................... | 198 33 342 |
| Aug. 7, 1998 | (DE) | ............................................... | 198 35 707 |

(51) Int. Cl.[7] ...................................................... F16D 25/08
(52) U.S. Cl. .................................. 192/85 CA; 192/91 A; 192/98
(58) Field of Search ........................... 192/85 CA, 91 A, 192/98, 110 B (56) References Cited

U.S. PATENT DOCUMENTS

| 5,113,991 | * | 5/1992 | Kajitani et al. ........................ 192/98 |
| 5,135,092 | | 8/1992 | Jäckel . |
| 5,287,951 | * | 2/1994 | Voit et al. ........................ 192/85 CA |
| 5,743,370 | * | 4/1998 | Thomire ........................... 192/85 CA |
| 5,810,145 | * | 9/1998 | Thomire ........................... 192/85 CA |
| 5,865,288 | * | 2/1999 | Thomire et al. ................. 192/85 CA |
| 6,076,645 | * | 6/2000 | Winkelmann et al. .......... 192/85 CA |

FOREIGN PATENT DOCUMENTS

| 196 35 101 A1 | 8/1996 | (DE) . |
| 196 09 472 A1 | 9/1997 | (DE) . |
| 2 757 590 A 1 | 6/1998 | (FR) . |
| WO-97/ 33097-A1 | * 9/1997 | (WO) . |

\* cited by examiner

Primary Examiner—Charles A Marmor
Assistant Examiner—Saúl Rodríguez
(74) Attorney, Agent, or Firm—Darby & Darby (57) ABSTRACT

A hydraulic clutch release mechanism, particularly for use in the power train of a motor vehicle, employs a circular piston which is reciprocable in a plenum chamber between a cylindrical housing and a guide centrally located within the housing. One end portion of the piston is form-lockingly connected with a plastic seal at the plenum chamber. Such form-locking connection is provided adjacent one of two lips forming part of the seal. The one lip engages the external surface of the guide and the other lip engages the internal surface of the housing and is adjacent another form-locking connection established between the seal and an annular plastic or metallic retainer which is affixed to the piston with limited axial play. The other end portion of the piston is operatively connected with a clutch, e.g., by way of a release bearing.

26 Claims, 5 Drawing Sheets

FIG. 1

FRICTION CLUTCH

ENGINE OF MOTOR VEHICLE

HYDRAULIC CLUTCH RELEASE MECHANISM

CROSS-REFERENCE TO RELATED CASES

This application is a cont. of PCT/EP99/04113, filed Jun. 15, 1999.

This application claims the priorities of commonly owned German patent applications Serial Nos. 198 33 342.0 (filed Jul. 24, 1998) and 198 35 707.9 (filed Aug. 7, 1998) and of commonly owned PCT application Serial No. WO 00/09621 filed Jun. 15, 1999. The disclosures of the above-enumerated patent applications, as well as of all US and foreign patents and patent applications identified in the specification of the present application, are incorporated herein by reference.

BACKGROUND OF THE INVENTION

The invention relates to fluid-operated clutch release mechanisms, and more particularly to improvements in hydraulic mechanisms which can be utilized with advantage to release clutches, such as friction clutches, in the power trains of motor vehicles. Still more particularly, the invention relates to improvements in hydraulic clutch release mechanisms of the type wherein a cylinder-piston unit employs a cylindrical housing and an internal guide which defines with the housing an annular plenum chamber for a reciprocable piston adapted to actuate the clutch by way of a release bearing or the like.

A hydraulic clutch release mechanism which is disclosed in published German patent application Serial No. 196 35 101 A1 employs a piston which is arranged to change the condition of a diaphragm spring in a friction clutch of the character often employed in the power trains of motor vehicles. The piston of the release mechanism carries a lip seal which is secured thereto by a connector. The latter is anchored in or recessed into the lip seal, and an axially extending leg of such connector is recessed into the peripheral surface of the piston.

A drawback of the just described conventional clutch release mechanism is that the seal is apt to jam and/or to be tilted in the plenum chamber; this exerts an adverse influence upon the guidance of the piston and can affect the ability of the piston to actuate the clutch.

OBJECTS OF THE INVENTION

An object of the present invention is to provide a hydraulic clutch release mechanism which is more reliable and lasts longer than heretofore known release mechanisms including that disclosed in the aforementioned German patent application Serial No. 196 35 101 A1.

Another object of the invention is to provide a novel and improved piston-seal combination for use in a hydraulic clutch release mechanism.

A further object of the invention is to provide a novel and improved arrangement for coupling the seal to the piston in a hydraulic clutch release mechanism.

An additional object of the invention is to provide a clutch release mechanism wherein the seal is not likely to leave its desirable optimum position relative to the piston.

Still another object of the invention is to provide a novel and improved method of securing the seal to the piston in the plenum chamber of a hydraulic clutch release mechanism.

A further object of the invention is to provide a novel and improved piston for use in the above out-lined hydraulic clutch release mechanism.

Another object of the invention is to provide a novel and improved seal for use in a clutch release mechanism of the above outlined character.

An additional object of the invention is to provide a novel and improved retainer which couples the seal to the piston in a hydraulic clutch release mechanism.

Still another object of the invention is to provide a power train which can be utilized in a motor vehicle and employs the above outlined improved clutch release mechanism.

SUMMARY OF THE INVENTION

The instant invention is embodied in a clutch release mechanism which comprises a cylinder-piston unit including a cylindrical housing having an internal surface, a centrally located guide having an external surface spacedly surrounded by the internal surface of the housing and defining with such internal surface a plenum chamber, and a piston which has spaced-apart first and second end portions and is reciprocable in the plenum chamber. The improved clutch release mechanism further comprises a seal which is disposed in the chamber at one end portion of the piston and includes a first section (such as an annular lip) contacting the internal surface of the housing, a second section (such as an annular lip) which contacts the external surface of the guide, and a third section which form-lockingly engages the one end portion of the aforementioned piston, and an annular retainer which is affixed to the piston and includes a portion form-lockingly engaging the seal.

The improved release mechanism can further comprise means (such as a bearing) for operatively connecting the other end portion of the piston with a friction clutch in a motor vehicle, e.g., with the prongs of a diaphragm spring.

The third section of the seal can include a first part which form-lockingly engages the one end portion of the piston and a second part which form-lockingly engages the aforementioned portion of the retainer. The retainer or the second part of the third section of the seal can be provided with an annular groove which extends substantially radially of the housing, and the other of these components is then provided with an annular bead which extends into and preferably fills the groove. It is presently preferred to provide the bead on the retainer.

The one end portion of the piston can be configured in such a way that it includes mutually inclined first and second surfaces which preferably make an angle at least approximating 90°; the first part of the third section of the seal is then provided or can be provided with mutually inclined third and fourth surfaces which respectively abut (such as lie flush against) the first and second surfaces.

The one end portion of the piston or the first part of the third section of the seal can be provided with an undercut recess, and the other of these components is then provided with a portion which at least substantially fills the undercut recess. For example, the recess can be provided in the one end portion of the piston.

Furthermore, the retainer or the piston can be provided with at least one projection which is received in a recess of the other of these components. The at least one projection can be received in the recess by snap action. Furthermore, the at least one projection can be received in the recess with at least some play as seen in the axial direction of the housing.

The one end portion of the piston can constitute a stepped cylinder having a first annular portion slidable along the guide and a second annular portion which is axially and radially offset relative to the first portion and is slidable along the housing.

Furthermore, the one end portion of the piston or the aforementioned portion of the retainer can be provided with an undercut annular groove for a projection which is complementary to the undercut annular groove and is provided on the seal.

The retainer can be affixed to the piston in any one of a plurality of different ways, e.g., by crimping, beading or burnishing. It is also possible to bond the retainer to the piston (e.g., by welding, soldering, brazing and/or by resorting to a suitable adhesive substance).

The retainer can be made of or can contain steel, aluminum or another suitable metallic material. It is also possible to make the retainer, at least in part, of a suitable plastic material. Furthermore, the retainer can constitute an extrusion, it can constitute a deep drawn article, or it can constitute a converted blank which has undergone a material removing treatment, e.g., in a lathe.

The retainer can be secured to the piston in a number of suitable ways. A presently preferred mode includes the utilization of a coupling which is carried by the piston and at least a portion of which extends into an opening of the retainer. Such portion of the coupling extends or can extend substantially radially of the housing, and the piston can be provided with a recess for the aforementioned portion of the coupling; this portion can extend into the recess of the piston with at least some freedom of movement as seen in the axial direction of the housing. Furthermore, the aforementioned portion of the coupling can be made, at least in part, of a resilient material and can be mounted in the at least one opening of the retainer and in the recess of the piston in prestressed condition (as seen radially of the piston).

The novel features which are considered as characteristic of the invention are set forth in particular in the appended claims. The improved clutch release mechanism itself, however, both as to its construction and the modes of assembling, installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 4b illustrates the retainer of FIG. 4a and a modified piston in a view corresponding to that of FIG. 4a;

DESCRIPTION OF PREFERRED EMBODIMENTS

Figure 1:
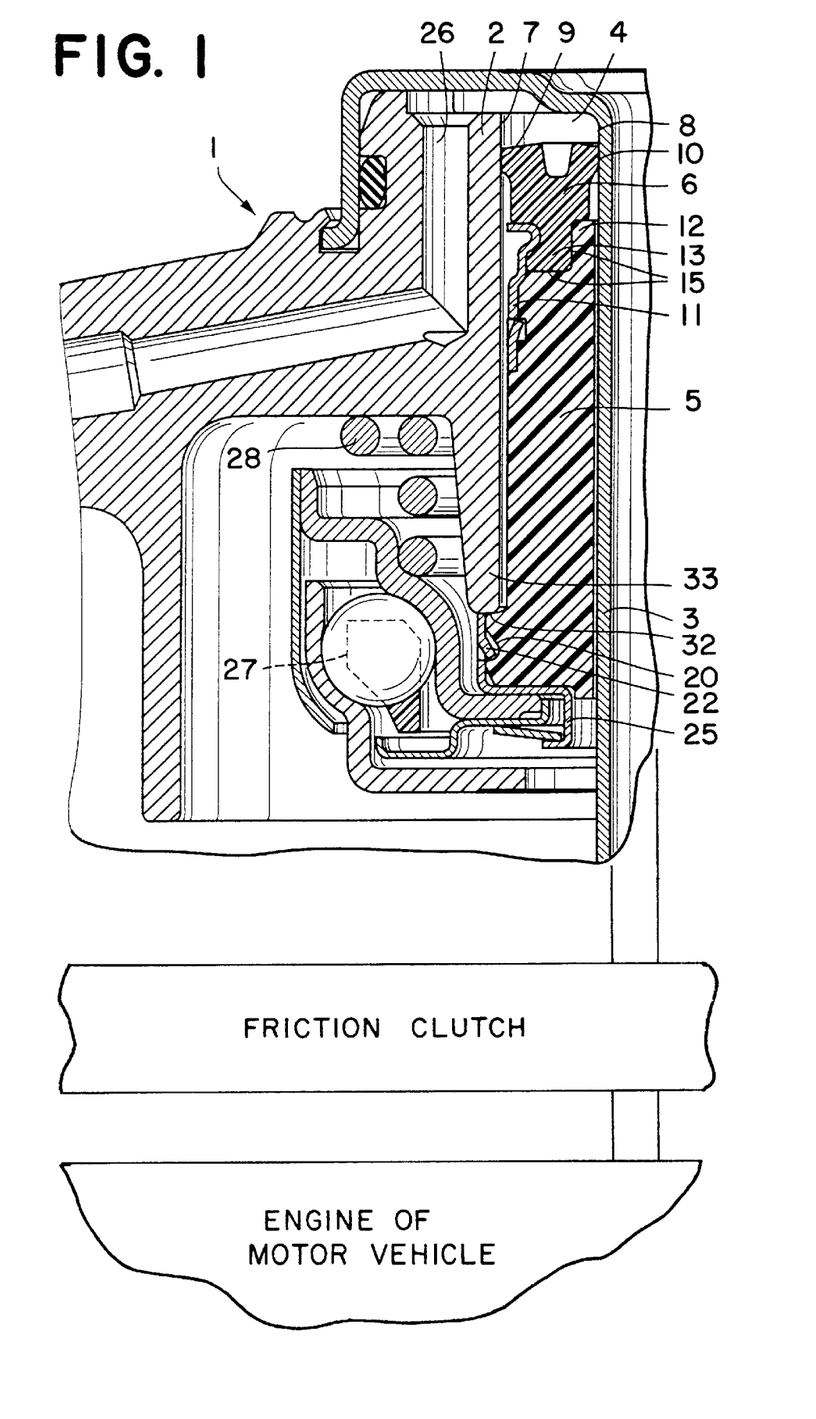
FIG. 1 is a fragmentary axial sectional view of a hydraulic clutch release mechanism which embodies one form of the present invention and employs a plastic piston, a plastic seal and a metallic retainer.

FIG. 1 shows certain relevant details of a hydraulic clutch release mechanism which includes a cylinder-piston unit 1 having a cylindrical housing 2 and a guide 3 which is coaxial with and is surrounded by the housing. The internal surface 7 of the housing 2 and the external surface 8 of the guide 3 define an annular plenum chamber 4 for an annular piston 5 which is coaxial with and is reciprocable along the surfaces 7, 8 of the parts 2, 3. The piston 5 includes an a annular end portion 12 which is movable away from and toward the lower end of the chamber 4 (as viewed in FIG. 1). The housing 2 has a suitably configurated channel 26 which can receive a hydraulic fluid (such as oil or a transmission fluid) serving to move the piston 5 axially of the housing 2 and guide 3.

The end portion 12 of the piston 5 carries an annular seal 6 having a first annular section or lip 9 sealingly engaging and slidable along the internal surface 7 of the housing 2, and a second annular section or lip 10 which sealingly engages the external surface 8 of the guide 3. The seal 6 further includes a third or median section 13 which is form-lockingly connected to the end portion 12 of the piston 5 and which is also form-lockingly connected with a portion 16 (see FIG. 2) of a cylindrical retaining member 11 (hereinafter called retainer for short).

That end portion of the piston 5 which is remote from the aforementioned end portion 12 is connected with a fastener 25 which is further connected with a clutch release bearing or disengaging bearing 27 serving to operatively connect the piston with the prongs of a diaphragm spring forming part of a friction clutch. Reference may be had, for example, to the friction clutch which is described and shown in commonly owned U.S. Pat. No. 5,135,092 granted Aug. 4, 1992 to Johann Jäckel for "APPARATUS FOR TRANSMITTING TORQUE". A helical coil spring 28 is provided to bias the release bearing 27 in the axial direction of the housing 2, guide 3 and piston 5.

The fastener 25 comprises a resilient projection 22 which is yieldably received in a recess or socket 20 of the second end portion of the piston 5, e.g., by snap action. FIG. 1 shows the piston 5 in that end position in which a radial shoulder 32 of the piston abuts a cylindrical protuberance 33 (e.g., the respective end portion) of the housing 2.

FIG. 1 further shows that the third section 13 of the seal 6 is form-lockingly connected with the end portion 12 of the piston 5 in a first manner and that this section 13 is form-lockingly connected with the portion 14 of the retainer 11 in a different second manner. Thus, and in contrast with the teachings of prior art, the section 13 of the seal 6 is form-lockingly connected not only with the end portion 12 of the piston 5 (adjacent the second section or lip 10) but also with the adjacent portion 14 of the retainer 11. This is tantamount to the establishment of two form-locking connections between the piston 5 and the seal 6 (one adjacent the lip 9 and the other adjacent the lip 10) because the retainer 11 is affixed to the piston. The establishment of such twin form-locking connections (one of which operates directly between the end portion 12 of the piston and the seal 6 adjacent the lip 10 and the other of which operates between the end portion 12 of the piston and the section 13 adjacent the lip 9 by way of the retainer 11) contributes significantly to a desirable fixing of the seal 6 to the piston 5 as well as to retention of the seal in an optimum position or orientation relative to the surfaces 7 and 8.

Figure 2:
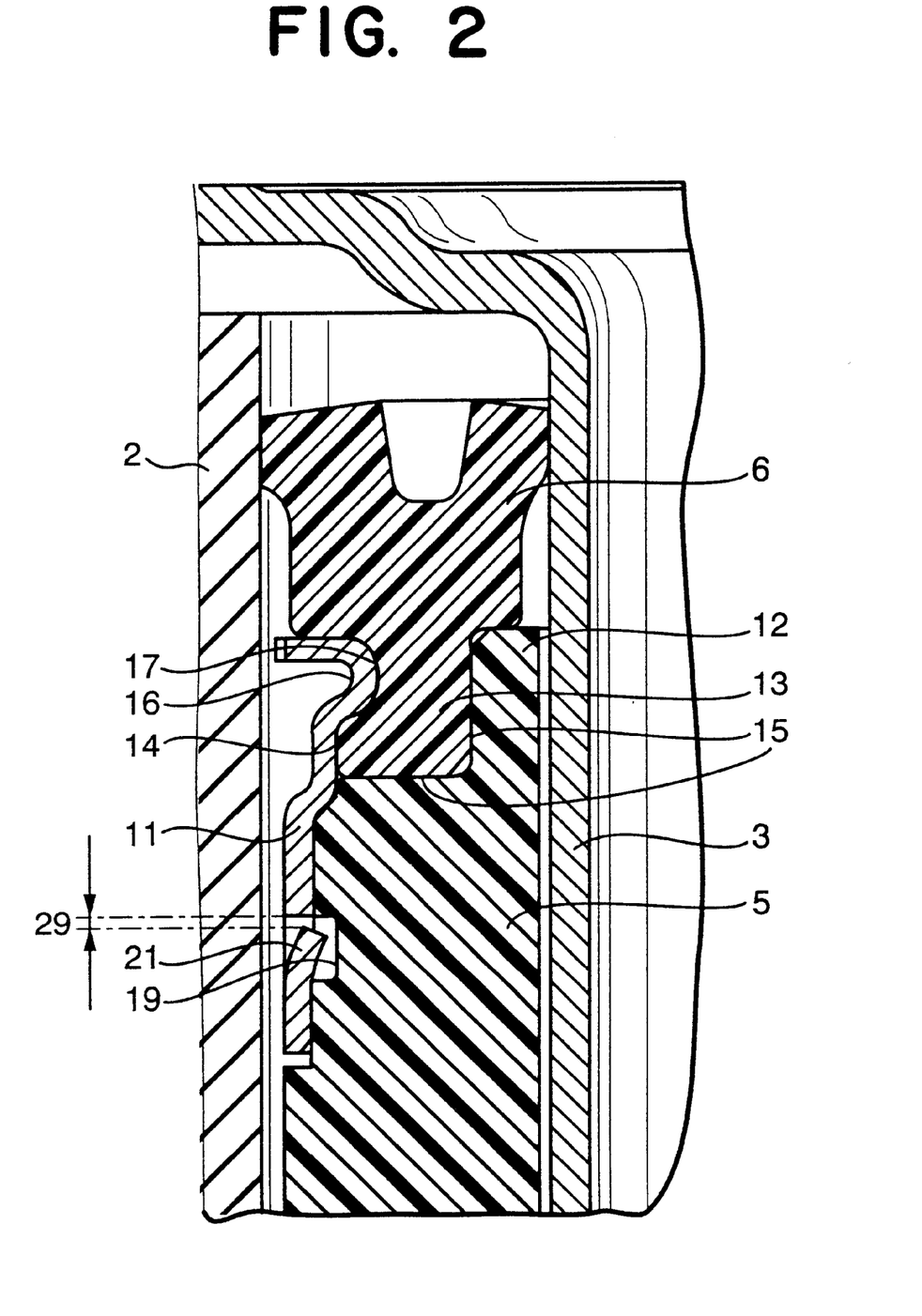
FIG. 2 is an enlarged view of a detail in the structure shown in FIG. 1.

FIG. 2 shows (drawn to a larger scale) the details of the form-locking connections between the third section 13 of the seal 6 on the one hand, and the end portion 12 of the piston 5 and the respective portion 14 of the retainer 11 on the other hand. This Figure further shows the details of one presently preferred manner in which the retainer 11 is fastened to the piston 5 adjacent the latter's end portion 12. The portion 14 of the retainer 11 is provided with an annular bead 16 which is form-lockingly received in and preferably fills a complementary groove or socket 17 in the third section 13 of the seal 6. The form-locking connection between the end portion 12 of the piston 5 and the section 13 of the seal 6 is established by two surfaces 12a, 12b of the piston and by the adjacent surfaces 15a, 15b of the section 13; the surfaces 15a, 15b make an angle of close to or exactly 900° and lie flush against the respective surfaces 12a, 12b. The end portion 12 of the piston 5 is stepped, i.e., it includes a first cylindrical part having a rectangular cross-sectional outline and being adjacent the guide 3 (this first cylindrical part is partially bounded by the surface 12a) and a second part extending from the retainer 11 to the guide 3 and bounded in part by the surface 12b.

The form-locking connection (at 16, 17) between the section 13 of the seal 6 and the portion 14 of the retainer 11 cooperates with the form-locking connection (at 12a, 12b and 15a, 15b) between the section 13 and the end portion 12 of the piston 5 to ensure that the orientation of the sections or lips 9, 10 relative to the piston 5, the housing 2 and the guide 3 remains unchanged regardless of whether the piston is idle or moves axially of the housing 2 and guide 3.

The retainer 11 is provided with a circumferentially complete or composite projection 21 which is received, preferably by snap action, in an adjacent recess 19 of the piston 5. The recess 19 is axially spaced apart from the third section 13 of the seal 6 and from the bead 16 of the retainer 11; this recess is dimensioned in such a way that the retainer 11 has limited freedom of axial movement relative to the piston 5 and vice versa. The clearance or axial play between the projection 21 and the surfaces bonding the axial ends of the recess 19 is shown at 29. The provision of such clearance is desirable or advisable because it reduces the likelihood of problems due to suction and/or axial vibrations.

An advantage of the piston 5 is that its end portion 12 is provided with a cylindrical end face 13c confronting the adjacent section or lip 10 of the seal 6. Thus, the configuration of this end face 12c is similar to that of the cylindrical surface 12b. Such configuration of the end portion 12 renders it possible to ensure that the radial forces exerted by the seal 6 upon the piston 5 (when the pressure of hydraulic fluid in the chamber 4 rises) are normal to the adjacent cylindrical surfaces of the end portion 12; this is desirable because such orientation of the aforementioned forces greatly reduces the likelihood of undesirable shifting of the seal 6 relative to the end portion 12 of the piston 5. The cylindrical surface 12a of the end portion 12 can be bonded (e.g., glued) to the adjacent cylindrical surface 15a of the section 12. This also applies for the surfaces 12b and 15b.

The portion 14 of the retainer 11 can be provided with several concentric axially spaced apart beads 16, and the section 13 of the seal 6 is then provided with an equal number of complementary grooves 17. Such beads and grooves greatly enhance the sealing action between the retainer 11 and the seal 6.

The retainer 11 can be produced or shaped in a deep drawing machine or it can constitute an extrusion. Such retainer can be made of steel, aluminum or another suitable metallic material. It is also possible to employ a laminate containing two or more layers made of one and the same material or of different materials.

Figure 3:
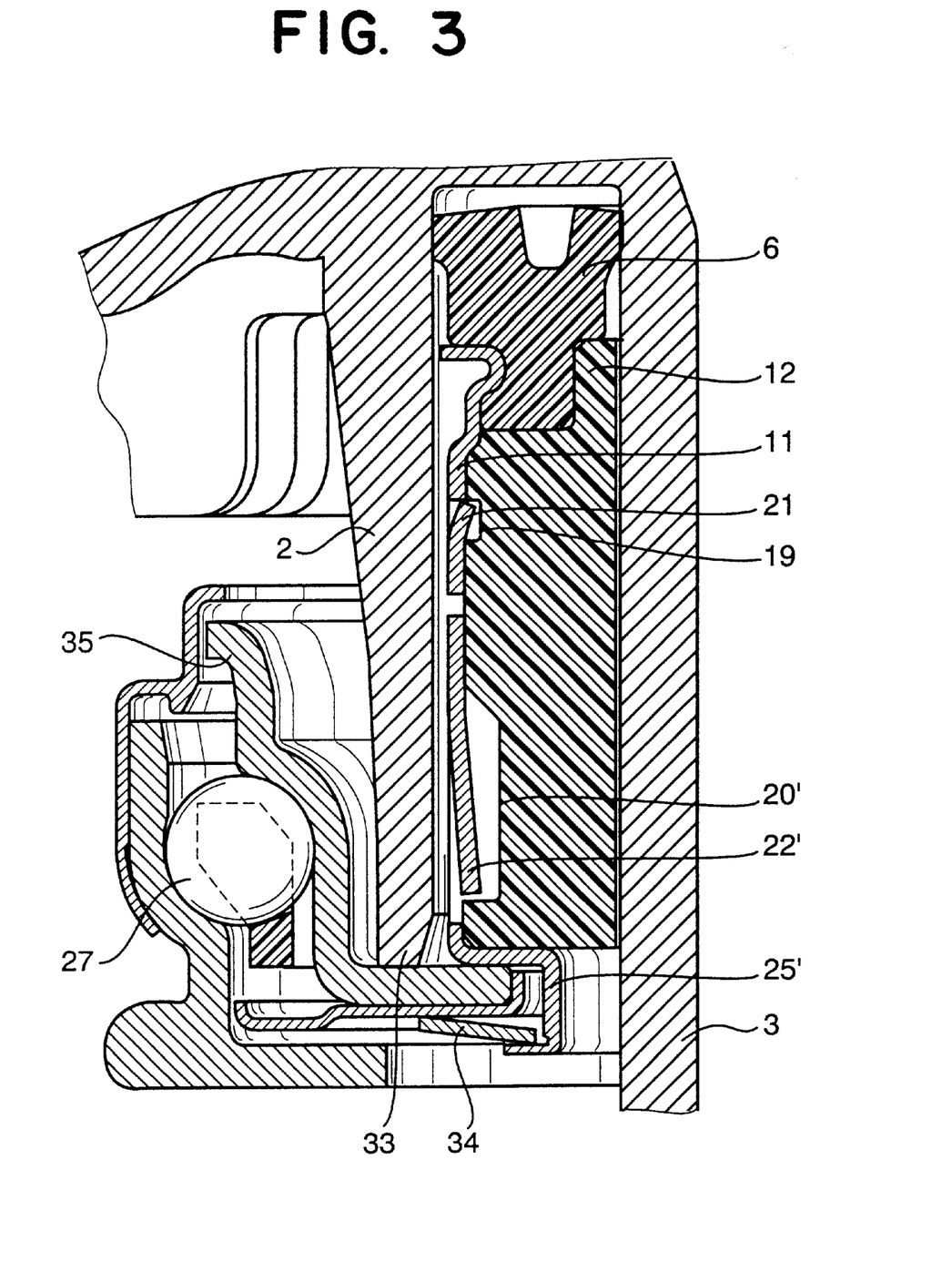
FIG. 3 is a fragmentary axial sectional view of a second hydraulic clutch release mechanism wherein the piston is operatively connected with a clutch release bearing in a manner different from that shown in FIG. 1.

FIG. 3 illustrates a portion of a second hydraulic clutch release mechanism wherein the lower end portion of the piston 5 (as seen in the drawing) is connected with the bearing 27 in a different way. The fastener 25' comprises a modified snap-on projection 22' which is received in a socket or recess 20' of the piston 5. The rigid non-rotatable inner race 35 of the bearing 27 is biased by a diaphragm spring 34 (which reacts against a portion of the fastener 25') when the piston 5 assumes the end position which is shown in FIG. 3; the inner race 35 then abuts the projection 33 of the housing 2. The manner in which the third section 13 of the seal 6 is form-lockingly connected with the end portion 12 of the piston 5 and with the portion 14 of the retainer 11 is identical with that described with reference to FIGS. 1 and 2.

Figure 4A:
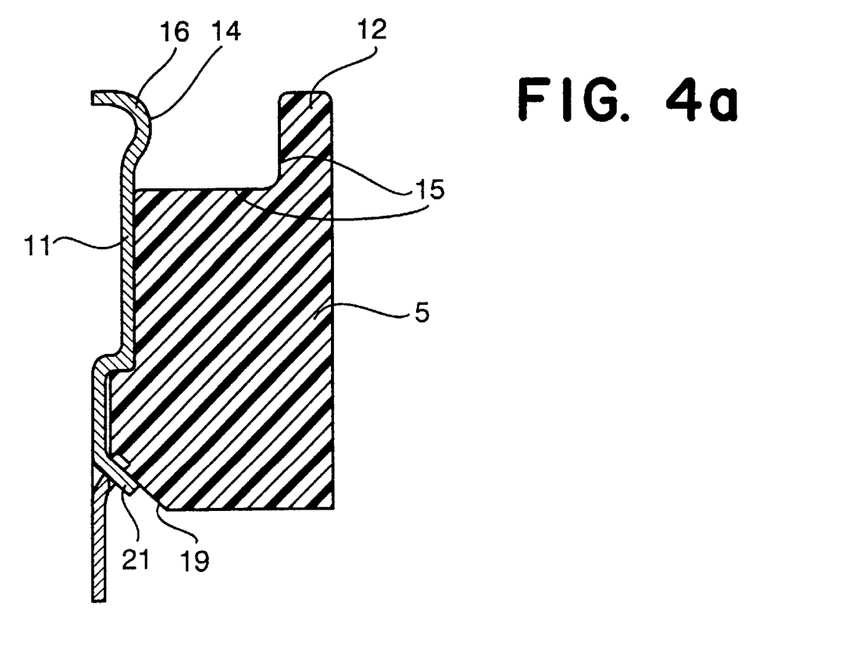
FIG. 4a is a fragmentary axial sectional view of a piston and of a retainer which is connected to the piston in a manner different from those shown in FIGS. 1–2 and 3.

FIG. 4a shows a metallic retainer 11 having a projection 21' extending into an undercut portion 19' of the piston 5. The manner in which the portion 14 of the retainer 11 is form-lockingly connected with the seal (not shown in FIG. 4a) is the same as described with reference to FIGS. 1 and 2. The same applies for the form-locking connection between the mutually inclined surfaces 12a, 12b of the end portion 12 of the piston 5 and the third section of the seal.

Figure 4B:
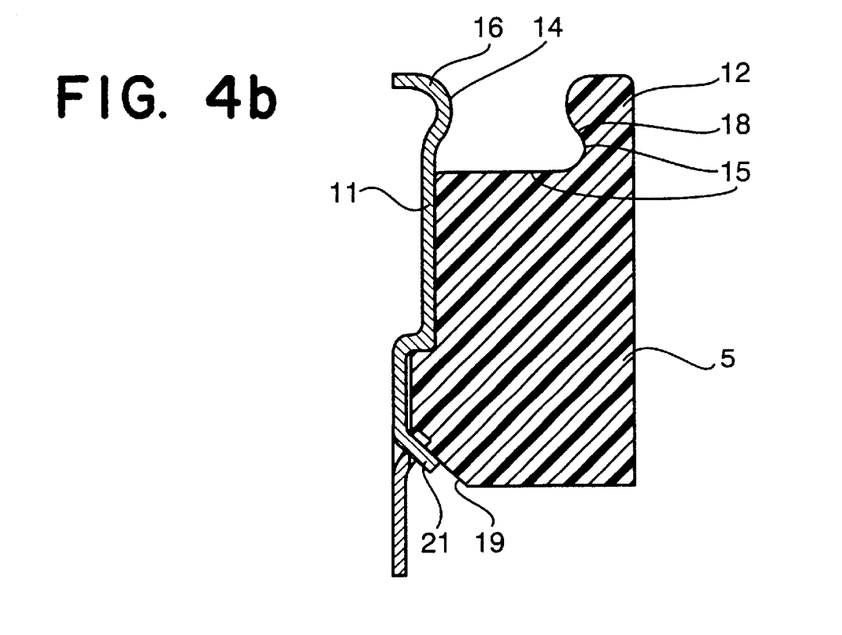

FIG. 4b illustrates a different form-locking connection between the end portion 12 of the piston 5 and the third section 13 of the seal 6 (not shown in FIG. 4b). The end portion 12 has an annular recess 18 which is provided in the surface 12a and receives a complementary bead of the third section (12) of the non-illustrated seal. The connection 19', 21' between the retainer 11 and the piston 5 is the same as the aforedescribed connection shown in FIG. 4a. The form-locking connection between the end portion 12 of the piston 5 of FIG. 4b and the third section of the non-illustrated seal is even more reliable than those described in FIGS. 1–2, 3 and 4a. The two form-locking connections (one of which includes the bead 16 and the other of which includes the recess 18) are or can be mirror images of each other.

In accordance with a modification, the form-locking connection between the retainer 11 and the third section 13 of the seal 6 and/or between the third section 13 and the end portion 12 of the piston 5 can be established by resorting to a crimping or burnishing technique.

Figure 5A:
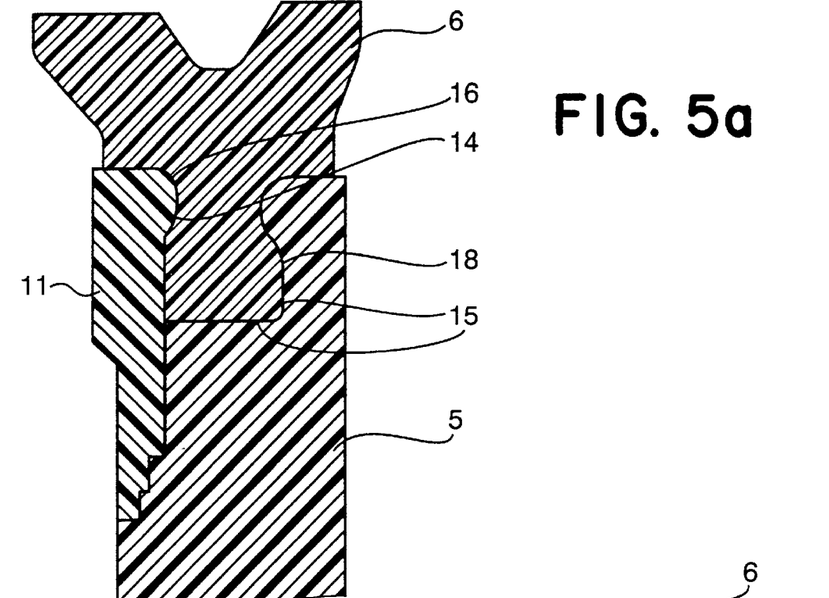
FIG. 5a is a fragmentary axial sectional view of a clutch release mechanism which employs a plastic retainer.

FIG. 5a shows a portion of a further hydraulic clutch release mechanism wherein the retainer 11" is made (e.g., in an extruder) of a suitable synthetic plastic material. This retainer is bonded (e.g., welded or glued) to the seal 6 and to the end portion 12 of the piston 5 against axial movement relative thereto. The form-locking connection (including the recess 18) between the section 13 of the seal 6 and the end portion 12 of the piston 5 is identical with or similar to that shown in FIG. 4b. That portion of the plastic retainer 11" which is bonded to the piston 5 is stepped to increase the area of contact.

The recess 18 and that portion of the section 13 which fills this recess contribute to the stability of this embodiment of form-locking connection between the section 13 of the seal 6 and the end portion 12 of the piston 5.

Figure 5B:
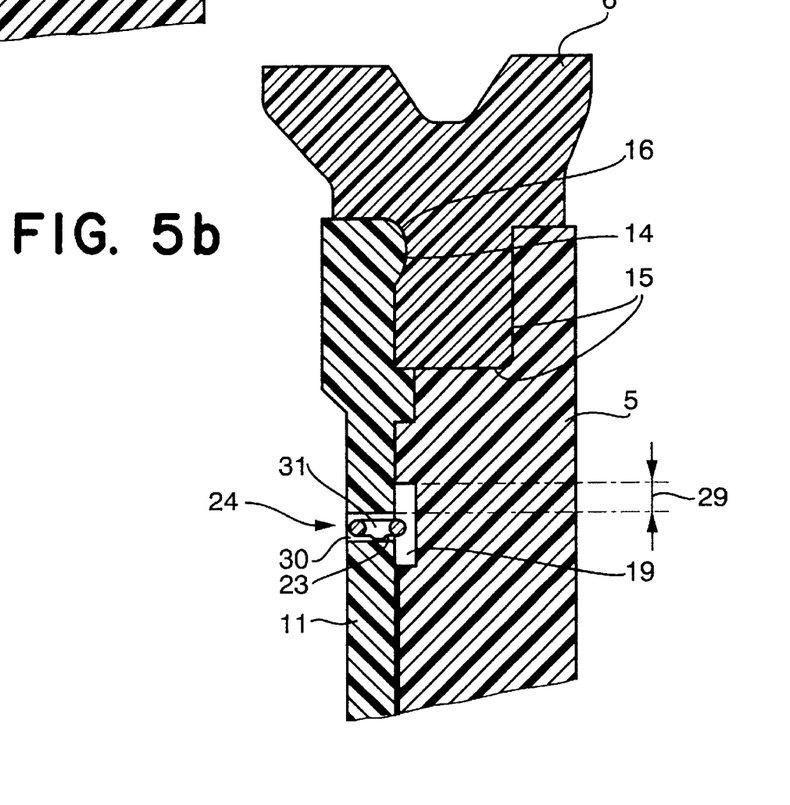
FIG. 5b is a similar fragmentary axial sectional view but showing a different piston, a different seal and a different retainer.

FIG. 5b shows a modified plastic retainer 11'" and a coupling device 24 which fixes the retainer to the adjacent portion of the piston 5. The coupling device 24 has a radially extending leg 31 a first portion of which extends (with axial play) into the recess or socket 19 of the piston 5. A second portion of the leg 31 extends into an opening 23 of the retainer 11'". The latter can be bonded (such as welded or glued) to the seal 6 and/or to the adjacent portion of the piston 5. The coupling device 24 is or can be installed in the recess 19 and/or in the opening 23 in a radially prestressed condition. The extent of possible radial play between the leg 31 of the coupling device 24 and the piston 5 is shown at 29.

The radially extending surface 15a of the piston 5 serves to take up radial forces acting between the end portion 12 of the piston 5 and the section 13 of the seal 6 shown in FIG. 5b. This also applies for the embodiments of FIGS. 1–2, 3 and 4a.

The plastic retainers 11", 11'" shown in FIGS. 5a and 5b can constitute extrusions. Such retainers can be made of any one of a variety of suitable synthetic plastic materials which can be readily bonded to the adjacent surfaces of normally or often preferably plastic seal 6 and/or piston 5.

As already mentioned hereinbefore, the form-locking connection(s) between the section 13 of the seal 6 and the adjacent portion of the retainer (such as the portion 14 of the retainer 11 shown in FIGS. 1–2, 3, 4a and 4b) can be established by resorting to a crimping, beading, or burnishing technique. Other modes of establishing such or similar or equivalent form-locking connections include bonding (such as welding or the resort to a suitable adhesive) as well as the utilization of resilient parts which can be reliably coupled to each other by snap action. If the retainer (such as 11" or 11'") is made of a plastic material, it is or it can be ultrasonically welded to the seal 6 and/or to the piston 5. The connection between the retainer and the section 13 of the seal 6 and/or the adjacent portion of the piston can be circumferentially complete or can consist of several parts, e.g., of a ring-shaped array of discrete connections.

An important advantage of the improved clutch release mechanism is that the third section 13 of the seal 6 is form-lockingly connected with the retainer 11, 11" or 11'" and preferably also with the adjacent end portion 12 of the piston 5. This not only enhances the quality of the connection between the seal 6 on the one hand, and the piston 5 and the retainer 11, 11" or 11'" on the other hand, but such connection further reduces the likelihood of undesirable changes of orientation of the sections 9, 10 relative to the housing 2 and guide 3.

Another advantage of the improved clutch release mechanism is that it can dispense with a discrete carrier for the seal 6. Moreover, the entire axial length of the piston 5 remains available for guidance of the seal 6 and for displacement of the release bearing 27.

The radial play between the retainer and the piston (refer, for example, to FIGS. 1–3 and 5b) is preferably selected in such a way that it permits a preselected range of radial movements of the retainer (and hence of the seal 6) relative to the piston. This reduces or eliminates several problems, such as those due to suction and/or vibrations.

The features which distinguish the illustrated embodiments from each other and/or the features which are characteristic of certain specific embodiments of the present invention can be utilized individually, exchangeably and/or in any desired practical combination with each other. For example, the coupling device 24 of FIG. 5b can be utilized in the embodiment of FIG. 5a or as a substitute for projection 21 and vice versa. Furthermore, the plastic retainer 11" can be replaced with a metallic retainer, the embodiment of FIG. 5b can employ several coupling devices and so forth.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydraulic release mechanisms, especially of release mechanisms for friction clutches in the power trains of motor vehicles and, therefore, such adaptations should and are intended to be comprehended within the meaning and range of equivalence of the appended claims.

What is claimed is:

1. A hydraulic clutch release mechanism, comprising:
a cylinder-piston unit including a cylindrical housing having an internal surface, a guide having an external surface spacedly surrounded by and defining with said internal surface a plenum chamber, and a piston having first and second end portions and being reciprocable in said chamber;
a seal disposed in said chamber at one end portion of said piston and including a first section contacting said internal surface, a second section contacting said external surface and a third section form-lockingly engaging said one end portion of said piston; and
an annular retainer affixed to said piston and including a portion form-lockingly engaging said seal,
wherein said third section of said seal includes a first part which form-lockingly engages said one end portion of said piston and a second part which form-lockingly engages said portion of said retainer.

2. The mechanism of claim 1, wherein said first and second sections of said seal include lips.

3. The mechanism of claim 1, further comprising means for operatively connecting the other end portion of said piston with a friction clutch in a motor vehicle.

4. The mechanism of claim 1, wherein said retainer contains a plastic material.

5. The mechanism of claim 1, wherein one of said retainer and said second part of said third section of said seal has an annular groove extending at least substantially radially of said housing and the other of said retainer and said second part of said third section of said seal has an annular bead in said groove.

6. The mechanism of claim 5, wherein said annular bead is provided on said retainer.

7. The mechanism of claim 1, wherein said one end portion of said piston has first and second surfaces making an angle which at least approximates 90°, said first part of said third section of said seal having third and fourth surfaces respectively abutting said first and second surfaces.

8. The mechanism of claim 1, wherein one of said one end portion of said piston and said first part of the third section of said seal includes an undercut recess and the other of said one end portion of said piston and said first part of the third section of said seal at least substantially fills said undercut recess.

9. The mechanism of claim 8, wherein said recess is provided in said one end portion of said piston.

10. The mechanism of claim 1, wherein one of said retainer and said piston has at least one projection received in a recess of the other of said retainer and said piston.

11. The mechanism of claim 10, wherein said at least one projection is received in said recess by snap action.

12. The mechanism of claim 10, wherein said at least one projection is received in said recess with at least some play in the axial direction of said housing.

13. The mechanism of claim 1, wherein said one end portion of said piston includes a stepped cylinder.

14. The mechanism of claim 1, wherein one of said one end portion of said piston and said portion of said retainer includes an undercut annular groove and said seal has a projection complementary to and received in said groove.

15. The mechanism of claim 1, wherein said retainer is affixed to said piston by one of the undertakings including crimping, beading and burnishing.

16. The mechanism of claim 1, wherein said retainer is bonded to said piston.

17. The mechanism of claim 1, wherein said retainer contains steel.

18. The mechanism of claim 1, wherein said retainer is a deep drawn article.

19. The mechanism of claim 1, wherein said retainer is a converted blank which has undergone a material removing treatment.

20. The mechanism of claim 1, wherein said retainer is an extrusion.

21. The mechanism of claim 1, wherein said retainer contains aluminum.

22. A hydraulic clutch release mechanism, comprising:

a cylinder-piston unit including a cylindrical housing having an internal surface, a guide having an external surface spacedly surrounded by and defining with said internal surface a plenum chamber, and a piston having first and second end portions and being reciprocable in said chamber;

a seal disposed in said chamber at one end portion of said piston and including a first section contacting said internal surface, a second section contacting said external surface and a third section form-lockingly engaging said one end portion of said piston; and an annular retainer affixed to said piston and including a portion form-lockingly engaging said seal, wherein said retainer has at least one opening and further comprising means for coupling said retainer to said piston including a portion received in said at least one opening.

23. The mechanism of claim 22, wherein said portion of said coupling means extends substantially radially of said housing.

24. The mechanism of claim 22, wherein said piston has a recess for said portion of said coupling means.

25. The mechanism of claim 24, wherein said portion of said coupling means extends into said recess with at least some freedom of movement in the axial direction of said housing.

26. The mechanism of claim 25, wherein said portion of said coupling means is resilient and is received in said at least one opening and said recess in a prestressed condition as seen radially of said piston.

* * * * *